US008812138B2

(12) United States Patent
Grigsby et al.

(10) Patent No.: US 8,812,138 B2
(45) Date of Patent: Aug. 19, 2014

(54) METHOD AND SYSTEM OF CONTROLLING AND/OR CONFIGURING AN ELECTRONIC AUDIO RECORDER, PLAYER, PROCESSOR AND/OR SYNTHESIZER

(76) Inventors: John Hilton Grigsby, Alameda, CA (US); Noel Jonathon Cragg, Alameda, CA (US)

( * ) Notice: Subject to any disclaimer, the term of this patent is extended or adjusted under 35 U.S.C. 154(b) by 1080 days.

(21) Appl. No.: 12/224,525

(22) PCT Filed: Feb. 27, 2007

(86) PCT No.: PCT/US2007/005023

§ 371 (c)(1), (2), (4) Date: Aug. 27, 2008

(87) PCT Pub. No.: WO2007/100798

PCT Pub. Date: Sep. 7, 2007

(65) Prior Publication Data

US 2009/0055007 A1 Feb. 26, 2009

(51) Int. Cl.

*G06F 17/00* (2006.01)
*G06F 3/00* (2006.01)
*G06F 3/16* (2006.01)
*G10H 7/00* (2006.01)

(52) U.S. Cl.

USPC ................ 700/94; 715/716; 715/727; 84/645

(58) Field of Classification Search

USPC .............. 84/600, 601, 645; 381/58, 118, 119, 381/120; 700/94; 715/716, 727, 723–726

See application file for complete search history.

(56) References Cited

U.S. PATENT DOCUMENTS

| | | | | |
|---|---|---|---|---|
| 2002/0002541 | A1* | 1/2002 | Williams | 705/51 |
| 2002/0082730 | A1* | 6/2002 | Capps et al. | 700/94 |
| 2003/0018755 | A1* | 1/2003 | Masterson et al. | 709/220 |
| 2005/0278760 | A1* | 12/2005 | Dewar et al. | 725/94 |

* cited by examiner

*Primary Examiner* — Jesse Elbin

(57) ABSTRACT

A method and system of controlling and/or configuring an electronic audio processor and/or synthesizer, comprises a network or bi-directional data port that allows such a device to be connected to a computer or computer network, as well as within the memory of the device, or within memory or other data storage attached to or integrated with the device, the software required for the user to control and/or configure the device itself from a computer, such that the software can be transferred to the computer, executed, and used to control and/or configure the device without requiring the user to have previously found and installed such control and/or configuration software on the computer through means other than those described herein.

18 Claims, 7 Drawing Sheets

200

METHOD AND SYSTEM OF CONTROLLING AND/OR CONFIGURING AN ELECTRONIC AUDIO RECORDER, PLAYER, PROCESSOR AND/OR SYNTHESIZER

CROSS-REFERENCE TO RELATED APPLICATIONS

This application claims the benefit of PPA U.S. 60/777,373, filed 27 Feb. 2006 with the USPTO by the present inventors.

FEDERALLY SPONSORED RESEARCH

Not Applicable.

SEQUENCE LISTING

Not Applicable.

BACKGROUND OF THE INVENTION

1. Field of the Invention

The present invention relates to audio processors and synthesizers, specifically to the methods and systems by which users may control and/or configure them.

2. Discussion of Prior Art

Historically, these devices contained analog circuits. Users controlled these circuits by turning knobs connected to potentiometers, pushing keyboard keys connected to switches, etc., thus altering the circuit itself and therefore the sound it produced. If reconfiguration was possible, it was done by physically moving or connecting wires between circuit elements, usually via physical switches or patch cords, though more recently through electronic switching.

Currently, most such devices contain digital processors (CPUs, DSPs, or custom digital logic), which create, modify, and/or play back audio via digital algorithms. (Occasionally the digital processors control analog circuits, but the application to this invention remains the same.) There are thousands of such devices today, far too many to individually enumerate here, and known collectively as "stompboxes", "multi-effect units", "synthesizers", and so on.

Users can control and/or configure these devices in several different ways, depending on the device in question. First, almost every such device has some combination of buttons, knobs, lights, and displays accessible to the user. However, their number, utility, and ability to present information is limited by the typically small size of such devices, and by the cost of including them in each unit sold.

It is, therefore, advantageous to provide some way to control and/or configure the device by connecting it to a general purpose computer, such as a desktop, notebook, or handheld (Palm, Handspring, Treo, etc.) This allows the user to use the display and interface devices of the computer, such as mice, keyboards, touchscreens, trackpads, and high-resolution displays, which are usually far superior to those built into the device. Here are the typical methods and systems of doing so, as of this writing:

1) Many such devices have MIDI ports, which allow the user to create digital data elsewhere (for example, with a digital keyboard or a computer) and send it to the device. MIDI is a one-way protocol and is very slow (31.25 Kbits/second—slower than modern modems), making it ill-suited to interactive communication with a computer.

Despite these issues, this method has been used occasionally in the past. However, since MIDI is a one-way protocol, the user must first find and install special software on his computer in order to do so.

2) Recently, some such devices have incorporated USB ports, which allow the user to connect the device to a computer. Typically this is only used to transfer digital audio files back and forth, not for control or configuration of the device; the device appears as a generic mass storage device to the computer, is treated as part of the computer's filesystem, and files are transferred through the standard filesystem interface.

Some devices allow the user to interactively control and/or configure the device from a computer via USB. However, in every case we are aware of, the user must first find and install special software on his computer in order to do so. (Also, in every case we are aware of, this software is specific to the computer and operating system.)

The best example we know of is the Nord Modular (made by Clavia), an audio processor and synthesizer. The Nord can be controlled and configured via graphical interface software running on a general-purpose computer, but only when directly connected to a computer through a USB port, and only after the user manually installs the program NMG2Editor (which only runs under Windows and Macintosh operating systems.)

3) Most recently, a very few such devices have incorporated Ethernet ports. This allows the user to connect the device to a standard computer network. Since such devices are most relevant to this invention, we will discuss each such device known to us at this time and its network functionality in order to demonstrate the uniqueness of this invention.

The first example is the Muse Receptor, a rack-mountable audio processor and synthesizer ("rack unit"). The Receptor can be controlled and configured in real-time via graphical interface software running on a general-purpose computer anywhere on the same network, and its internal software can be updated via the network. However, to control and configure the Receptor, the user must first install the program ReceptorRemote on each computer they wish to use in this way. (And ReceptorRemote runs only under Windows and Macintosh OSX operating systems.)

The second example is the Looperlative LPI, a single-purpose rack-mountable audio processor ("rack effect") designed to loop audio during real-time performances. Connecting it to a network allows it to automatically download updates to its internal software, and allows the user to upload and download raw audio files. However, it cannot be controlled or configured via the network, and the interface is both non-interactive and entirely text-based, having less functionality than the raw filesystem interface provided by all modern computers and operating systems (Windows, Mac OSX, Linux, etc.)

The third example is the Manifold Labs Plugzilla, a rack unit essentially similar to the Muse Receptor, though the remote control and configuration options are apparently limited to adding and removing plugins. Configuration requires the user to have previously installed a Windows application called PZView.

There are also many software programs that use a general-purpose computer's on processing power, or dedicated DSPs connected directly to the computer, to process and/or synthesize audio. Most such programs have graphical interfaces, and all are known to those skilled in the art of computer-based electronic music. The oldest and best-known is the program MAX and its various incarnations, beginning as Patcher in 1986 on the Macintosh, becoming MAX/FTS in 1989, and subsequently MAX/MSP and Pd. It allows control and configuration of real-time MIDI and audio data processing via a graphical drag-and-drop interface, and predates most patents on such systems, such as U.S. Pat. No. 6,981,208 (Milne et. al., 2005). Other such programs include Reaktor, SuperCollider, and the various graphical interfaces to Csound.

However, Milne et. al. specifically claim and describe their graphical interface as running locally, on the same computer system as the audio engine. As of this writing, Reaktor's graphic interface is part of the program and cannot be run remotely. SuperCollider's and Pd's graphical interfaces can be run remotely, but like the devices and inventions previously described, the user must first install the graphical interface software on any computer he wishes to use in this way.

SUMMARY OF DISADVANTAGES OF PRIOR ART

In conclusion, there are many electronic audio processors and synthesizers that can be controlled and/or configured remotely from a general-purpose computer, often by a drag-and-drop or other graphical interface. There are also many software programs that give this functionality to a general-purpose computer.

However, we are not aware of any such device, or any patent describing any such device, that allows the user to control and/or configure the device from a general-purpose computer without previously having to find and install special control and/or configuration software on that computer. This disadvantage has several consequences, including the following:

The software installation process takes time, is inconvenient, and must be repeated every time the user wishes to use a different computer to control and/or configure the device.

The version of the software on the computer may be incompatible with the version of the device the user is attempting to control and/or configure. Attempting to maintain compatibility and detect non-compatibility across multiple potential combinations of software versions is a major problem for both developers and users of the software and device.

When updates are desired or required, the user must update both the device and the computer software.

The user may not have access to the installation media or the Internet from the computer in question, leaving him unable to install the software and control and/or configure the device.

Particularly on multi-user systems, the user may not have permission to install the software on the computer available to him, leaving him unable to control and/or configure the device.

OBJECTS AND ADVANTAGES

The objects and advantages of previous inventions as described above are to allow the user to control and/or configure a device incorporating an embodiment of the invention from a general-purpose computer. This allows the user to use the display and interface devices of the computer, which are generally much more capable and easier to use than the few knobs, buttons, and small displays that can fit into the form factors typical for audio processors and/or synthesizers.

Since devices incorporating an embodiment of these inventions do not need to integrate a graphic display or other complex visual interface, nor must they integrate large input devices like keyboards or mice (or awkward substitutes for such), such devices can be manufactured at a smaller size and at lower cost. Additionally, such devices are typically less physically fragile, and use less power, than those with displays or large input devices.

The objects and advantages of the present invention over previous inventions as described above are to allow the user to control and/or configure electronic audio processors and/or synthesizers from a general-purpose computer without first having to find and install special control and configuration software on each computer he wishes to use in this way.

Additional consequences of this advantage are:

The version of the software is never incompatible with the version of the device the user is attempting to control and/or configure. As previously described, attempting to maintain compatibility and detect non-compatibility across multiple potential combinations of software versions is a major problem for both developers and users of the software and device.

When updates are desired or required, only the device must be updated: the software is updated as part of the device update.

The software is always available to the user, even if the user doesn't have access to the installation media, the Internet, or a computer with the software already installed.

In preferred embodiments of the invention, the user does not need permission to install software on, or run software from, a locally accessible filesystem.

In preferred embodiments of the invention, the user does not need to own a specific type of computer hardware or run a specific operating system in order to use the invention (although platform-specific software is still possible within the scope of the invention.)

SUMMARY

The invention, a method and system of controlling and/or configuring an electronic audio processor and/or synthesizer, comprises within the memory of such a device, or within memory or other data storage attached to or integrated with the device, the application program(s) and associated data (collectively known as "software") required for the user to control and/or configure the device itself from a general-purpose computing device, as well as a network or bi-directional data port that allows it to be connected to a general-purpose computer or computer network.

To use the method and system of the invention, the user connects the device to a computer or computer network, establishes a connection from a computer on the network to the device, and requests interaction with the device. The device transfers the software to the computer. The software runs on the computer. The user then interacts with the software, the software communicates with the device, and the device controls and/or configures itself as per the communication. The user repeats the interaction and these steps (interact, communication, control and/or configuration) until he is satisfied with the results, and the device continues to function as controlled and/or configured.

DRAWINGS

DETAILED DESCRIPTION

Figure 1:
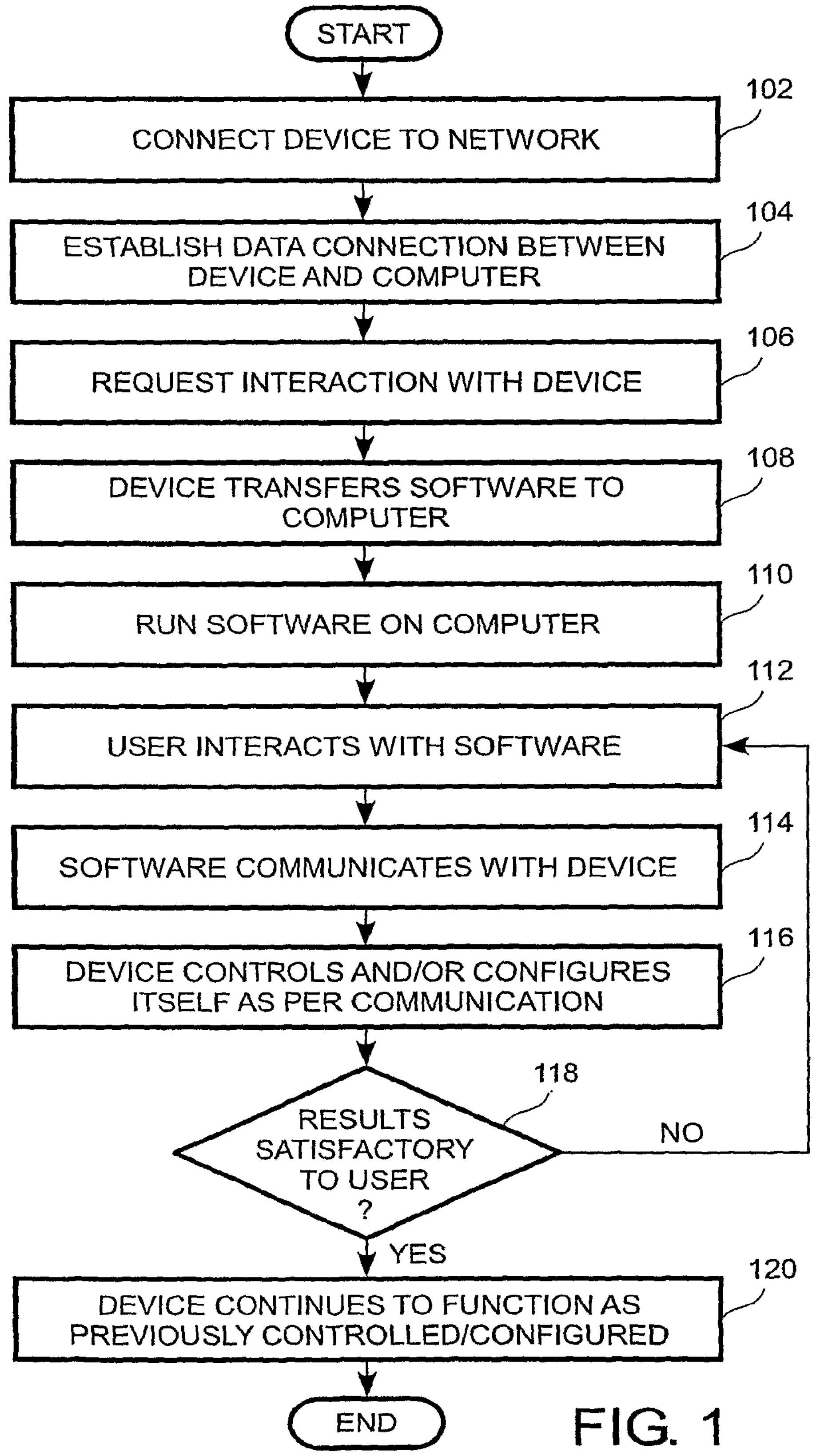
FIG. 1 is a flowchart of the invention in use.

Some definitions, as used in this document:

An "audio input" is a means by which sound waves, or digital or analog representations of sound waves, may be introduced into a device. This means may be dedicated specifically to the task of gathering audio, i.e. a microphone or a ¼" audio jack carrying an analog audio signal, or shared, i.e. a USB or Ethernet connection carrying digital audio data.

An "audio output" is a means by which sound waves, or digital or analog representations of sound waves, may be produced by a device. This means may be dedicated specifically to the task of producing audio, i.e. a speaker or a ¼" audio jack carrying an analog audio signal, or shared, i.e. a USB or Ethernet connection carrying digital audio data.

An "audio processor" or "audio processing device", frequently known as an "effects processor", takes one or more audio inputs, modifies the audio in some way, and sends it to one or more audio outputs. Examples of such modifications, which may be combined, include delay, waveshaping, equalization, and modulation of these modifications by internally or externally generated waveforms, producing results known commonly as "flanging", "distortion", "reverberation", etc. This modification may be performed directly by a digital processor, or indirectly in part or full by analog circuits controlled by the digital processor.

An "audio synthesizer", "audio synthesizing device", or "synthesizer" creates audio (this can include playback on demand of previously stored audio, synthetic generation of audio waveforms, and/or combinations of both) and sends it to one or more audio outputs. This audio is typically generated according to user manipulation of the device's controls, or an input data stream representing manipulation of such controls. This generation may be performed directly by a digital processor, or indirectly in part or full by analog circuits controlled by the digital processor.

An "audio player" or "audio playing device" is a special case of an audio synthesizer, which stores previously created representations of audio either within itself or on removable media connected to it, and sends the audio on demand to one or more audio outputs. It may modify the stored audio on output. This playback may be performed directly by a digital processor, or indirectly in part or full by analog circuits controlled by the digital processor.

An "audio recorder" or "audio recording device" is a special case of an audio player, with the additional ability to record and store incoming audio in real-time.

A "portable audio player" or "portable audio recorder" is a special case of an audio player or recorder, which can run from an internal power source and is easy to carry along in the course of most normal daily activities. These devices are often colloquially known as "MP3 players", even though MP3 is only one of the audio data formats they can interpret.

(Note: Many modern devices popularly known as "audio players" or "MP3 players" also have the ability to record audio, so the semantic line between "player" and "recorder" is somewhat blurred in everyday usage. Many modern devices popularly known as "synthesizers" also have the ability to process audio, giving them some functions of "effects processors", and vice versa. In general, for modern devices in which audio playback, processing, and synthesizing is entirely or substantially performed by digital processors executing digital algorithms, it is almost always possible for the same device to record, process, synthesize, and play audio. The distinction, therefore, is usually one of software and frequently one of primary intended function, not of capability of the physical circuits comprising the device.)

A "stompbox" is a special case of an audio processor, which is designed to be placed in the audio signal chain between an electric musical instrument, such as a guitar, and an amplification device for such an instrument, such as a guitar amplifier. Its enclosure rests on the floor in typical use, and it generally comprises at least one control which the user can operate with a shod foot without damaging the device—usually a switch that bypasses its processing when turned off.

By "device", we mean "audio processor and/or synthesizer" unless stated otherwise.

By "controlling and/or configuring", we mean the act of changing, rearranging, substituting, loading, and/or saving audio processing, synthesis, recording, and/or playback algorithms, parameters to said algorithms (including audio data), signal routing between said algorithms, and/or properties of audio inputs, audio outputs, physical controls, displays, and/or other features of such a processor and/or synthesizer.

By "computer", we mean any general-purpose computing device that can be connected to a network. At this writing, this typically means a desktop, notebook, or PDA.

By "computer network", we mean any means by which a computer call send and receive data from other computers or (generic, not just audio) devices on the network. At this writing, this typically means peer-to-peer networks such as Ethernet, 802.1x, and other Internet networking technologies, although non-peer-to-peer connections such as USB, Firewire, Bluetooth, and generic serial port connections are also within the scope of this definition and invention. Please note that it only requires two devices to make a network: for instance, a computer connected to an audio synthesizer through a USB port is a network with two nodes.

By "network connection", we mean any connection of the type described in the previous definition of "computer network".

(The preceding two definitions allow us to avoid the cumbersome "computer and/or computer network" and "network and/or data connection" circumlocutions.)

By "software", we mean any combination of program(s), subroutines, code fragments, and data associated with them. The data may be embedded in the program or stored separately.

By "client software", we mean software that requests and receives data and/or services from another system known as the "server" and running "server software", the server usually, but not necessarily, located on another computer or device. (In a strict definition of "client" and "server", the server cannot provide any services or data without an explicit request from the client: however, as is common to those skilled in the art, we use these terms less strictly, and the server is allowed to push data or provide services to the client without an explicit request. Otherwise we are forced into circumlocutions such as "peer-to-peer software whose primary role is as a server to peer-to-peer software whose primary role is as a client"—which are themselves misleading, because true peer to peer software must be able to both request and provide services to and from any other instance.)

Both "memory" and "storage" refer to data storage accessible by a digital processor, and usage of one or the other is primarily a matter of custom rather than definition. "Memory" can mean both volatile and non-volatile data storage, usually internal to a computing device. By "storage", we usually mean external non-volatile data storage.

Figure 3:
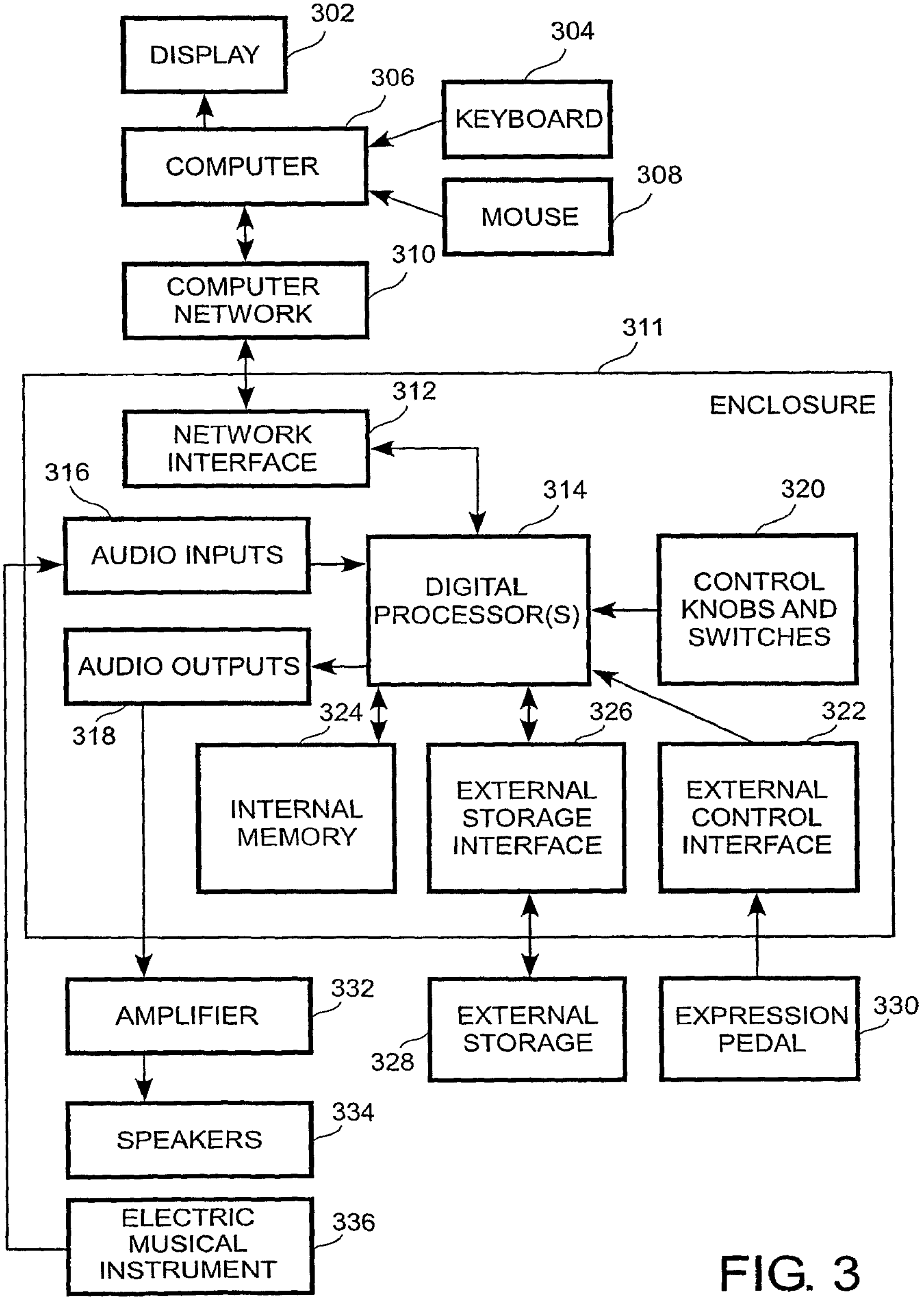
FIG. 3 is a block diagram of the device in FIG. 4 in typical use.

FIG. 1 is a flowchart of the invention. To usefully describe it, we must apply it to the control and configuration of a preferred embodiment—in this case, the audio processor ("stompbox") shown in FIG. 4 and FIG. 5, and whose block diagram in typical use is shown in FIG. 3, the stompbox itself represented by 311. Therefore, implementation-specific details are illustrative, and as such, assumed to be characteristics of the embodiment described and not limitations of the scope of the invention.

For clarity, we assume at the start of the flowchart in FIG. 1 that the user has already connected the stompbox 311 as shown in FIG. 3 to an electric musical instrument 336, amplifier 332, and speakers 334; that a computer 306 is already connected to a TCP/IP based computer network 310; and that the stompbox already has a valid IP address for the network.

In 102, the user connects the network port 312, 460 of the stompbox 311, 400 to an open port on the computer network 310. In 104, the user establishes an HTTP connection between the computer and the stompbox, by typing the IP address of the stompbox into the address bar of a web browser or by calling up a previously saved bookmark. This also serves as a request for interaction with the stompbox 106.

In 108, the HTTP request from 104 also causes the stompbox to transfer software (in this embodiment, a Java application called AGE and its associated data) to the computer, and causes the computer to run AGE 110.

(Please take special note of 106, 108, and 110, as they embody the major improvements and inventive steps of our invention. Previous inventions simply assume that the software already exists on the computer, ignoring the problems of how and when the software got there, whether the software is a correct or compatible version, and other problems previously enumerated.)

Figure 2:
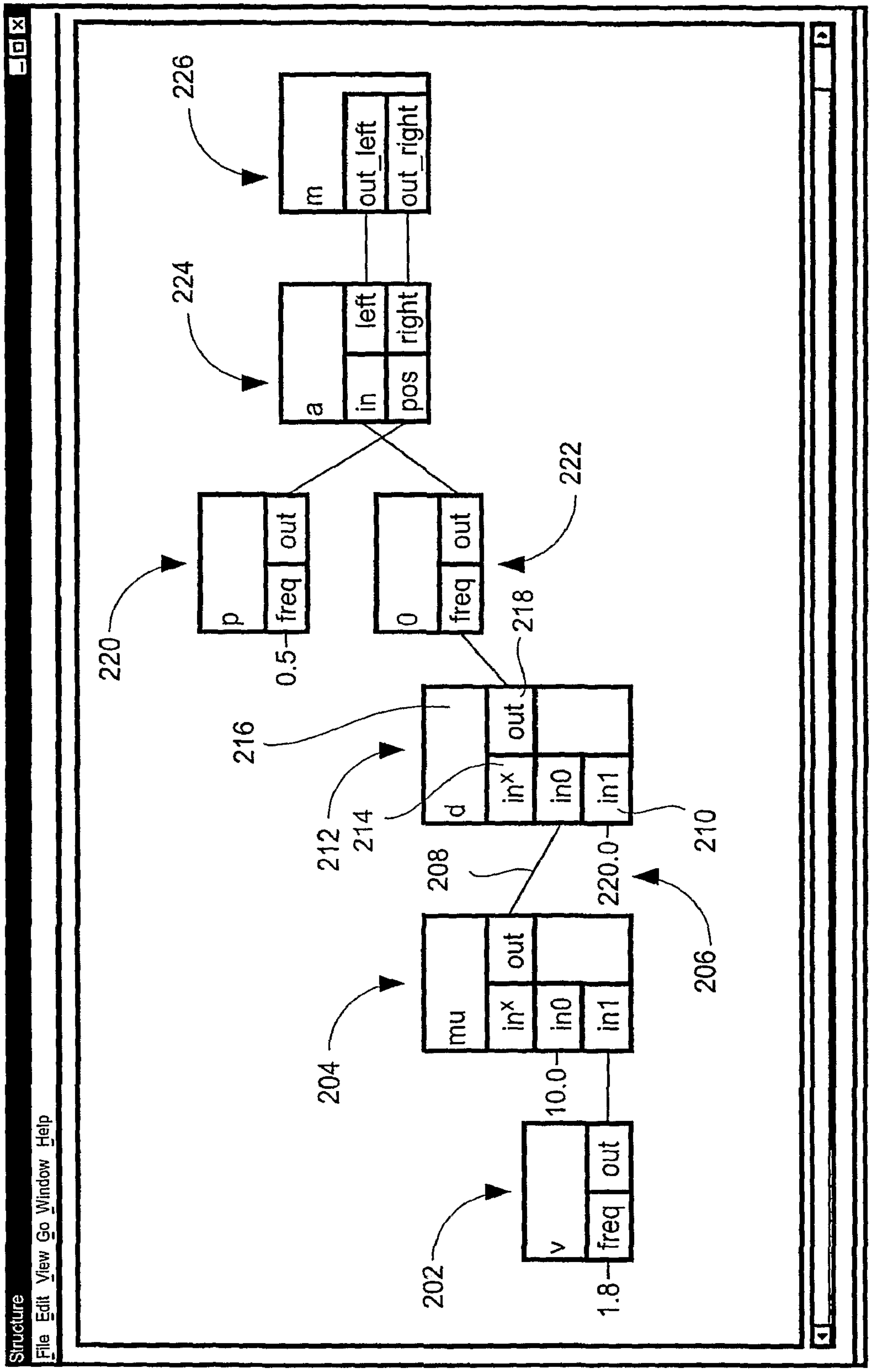
FIG. 2 is a screenshot of software controlling and/or configuring an electronic audio processor and/or synthesizer in a preferred embodiment.

In 112, the user interacts with AGE, using the display 302, keyboard 304, and mouse 308 attached to the computer 306. FIG. 2 is a screenshot of AGE in typical use, and we will describe some specifics of user interaction below.

In 114, AGE communicates the results of the user's interaction to the stompbox. In 116, the stompbox controls and/or configures itself as per the communication. Note that at any time during this process, the stompbox may communicate results of this communication, or any other data, to AGE (not shown in flowchart because it can happen at any stage). Examples of such communications include actual vs. requested state, audio data at a specified stage of processing, state of physical controls on the stompbox 402, 404, 406, dynamically loaded application programs to control and/or configure other aspects of the device or other similar devices, input sensitivity and calibration, network configuration, and so on.

In 118, the user evaluates the results of his interaction, usually by playing the electric musical instrument 336 and listening to the resulting audio output through the amplifier 332 and speakers 334. If the results are not yet satisfactory, the user returns to 112 and continues interacting with AGE.

If the results are satisfactory, the stompbox continues to function as currently controlled and configured 120, even if the user closes his browser or disconnects the stompbox from the network.

FIG. 2 is a screenshot of AGE, an interactive graphical interface, in its Structure Edit mode, showing one way that the stompbox can be controlled and configured by software running on the computer 306. The window 200 contains elements representing audio processing algorithms 202, 204, 212, 220, 222, 224, and/or features of the stompbox such as audio outputs 226 (also see 318, 454). Not shown in FIG. 2 but also configurable in this way include audio inputs 452, 316, control inputs 456, 322, control knobs 404, 320 and switches 402, 406, 320. Each element can contain inputs 210, 214 and/or outputs 218, and is captioned with its type 216. Elements are connected together by wires 208, and can also be connected to constants 206 or variables (not shown). The user can add elements, remove elements, and connect and disconnect wires between inputs and outputs, and the results of this interaction are sent to the stompbox, which configures its audio processing algorithms accordingly, thus controlling and configuring the stompbox.

FIG. 3 is a block diagram of the stompbox, a preferred embodiment, in typical use. An electric musical instrument 336 is connected to an audio input 316, and an amplifier 332 and speakers 334 are connected to an audio output 318. The digital processor 314 takes audio from the input, processes it, and sends it to the output, according to algorithms stored in internal memory 324 and/or external storage 328 through the external storage interface 326 (also see 408). These algorithms and/or their parameters are modified by the control knobs and switches 320 (also see 402, 404, 406), by an expression pedal 330 through the external control interface 322 (also see 456), or by receiving communication from AGE through the network interface 312 (also see 460).

Figure 4:
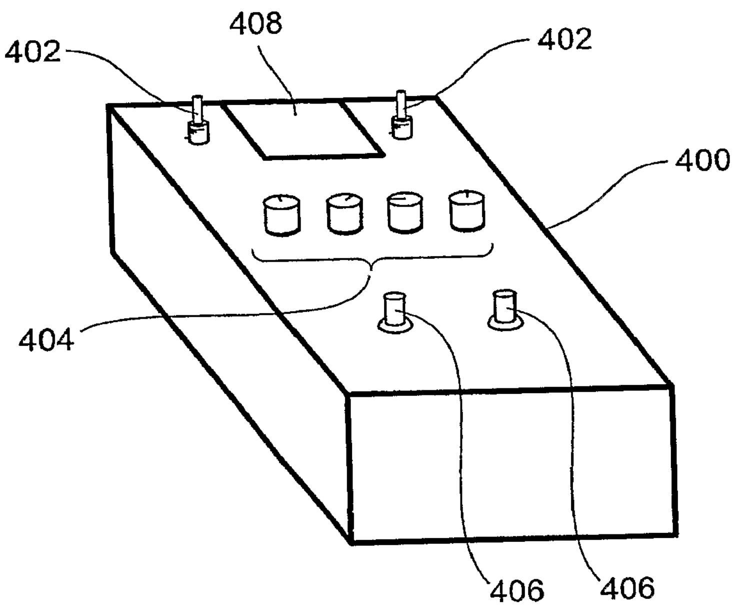
FIG. 4 is a ¾ view of a preferred embodiment, an audio processor in a form factor popularly known as a "stompbox".
Figure 5:
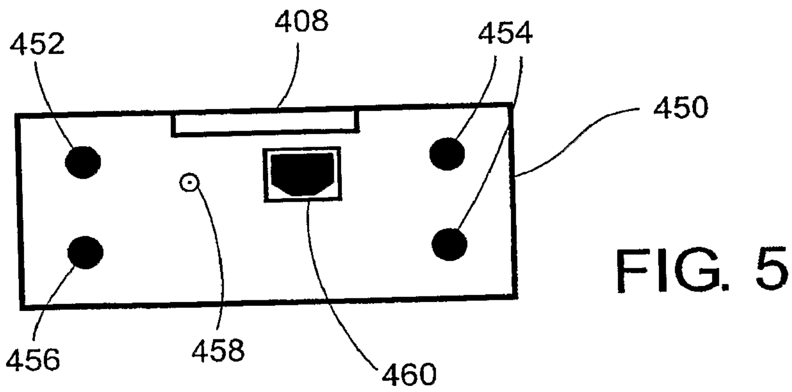
FIG. 5 is a view of the rear panel of the device in FIG. 4.

FIG. 4 is a preferred embodiment of the stompbox in FIG. 3, and FIG. 5 is the rear panel of the stompbox. The user can manipulate footswitches 406 (designed to be operable by the user's foot when the enclosure 400 is placed on the ground, and one of which is typically used to turn audio processing on and off such that when "off", audio passes through from input to output without processing), control knobs 404, and control switches 402. An external storage slot 408 allows the user to attach an external memory storage device (not shown), which comprises audio processing algorithms, associated data, and other control and/or configuration data, and potentially AGE.

FIG. 5 is a view of the rear panel 450 of the stompbox in FIG. 4. It comprises analog audio inputs 452, analog audio outputs 454, the external control interface 456 to which can be connected an expression pedal (not shown), an Ethernet network port 460, and a power supply input 458. Also visible is the external storage slot 408.

Figure 6:
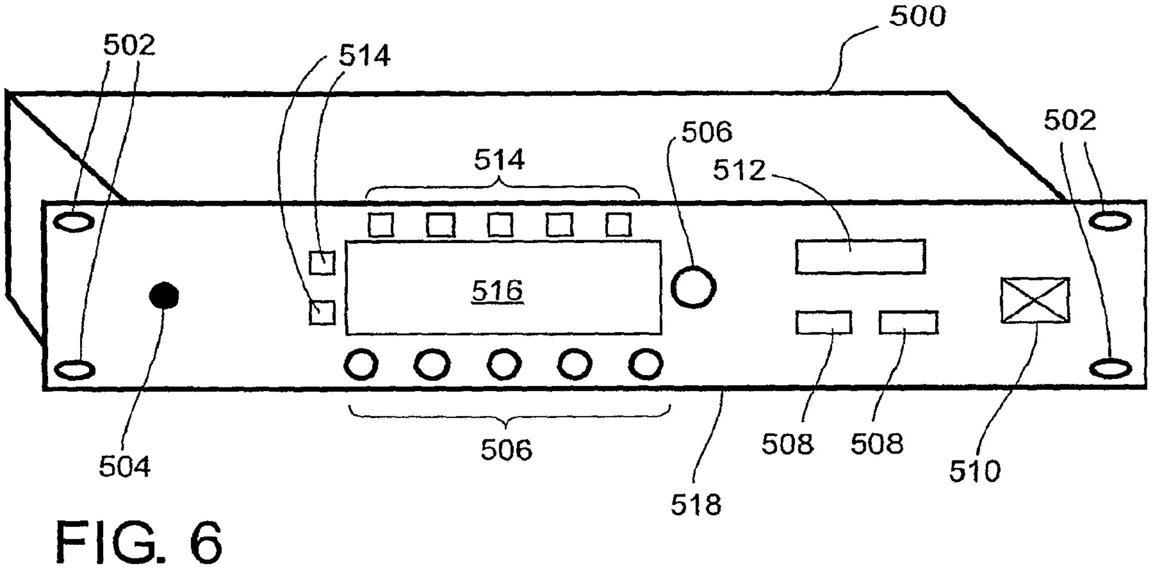
FIG. 6 is a ¾ view of a preferred embodiment, an audio processor and/or synthesizer in a form factor popularly known as a "rack effect" or "rack synthesizer".

FIG. 6 is a ¾ view of a preferred embodiment, an audio processor and/or synthesizer in a form factor popularly known as a "rack effect" or "rack synthesizer", and known generically as a "rack unit". (As explained above, the difference between the two is almost always software and primary intended function, and not physical.) The enclosure 500 has rack mounting holes 502 on its front panel 518 which can be affixed to a standard 19" equipment rack. For convenience when used as a rack effect, an instrument-level analog ¼" audio input 504 is available on the front panel. Control knobs 506 and switches 514 surround a display 516 showing current function of knobs and switches, configuration of the rack unit, menu options, or other useful information. An external storage slot 512 allows the user to attach an external memory storage device (not shown) as in FIG. 4. USB ports 508 allow attachment of additional storage devices or useful peripherals, or provide an alternate method of connecting to a computer network. 510 is the power switch.

Figure 7:
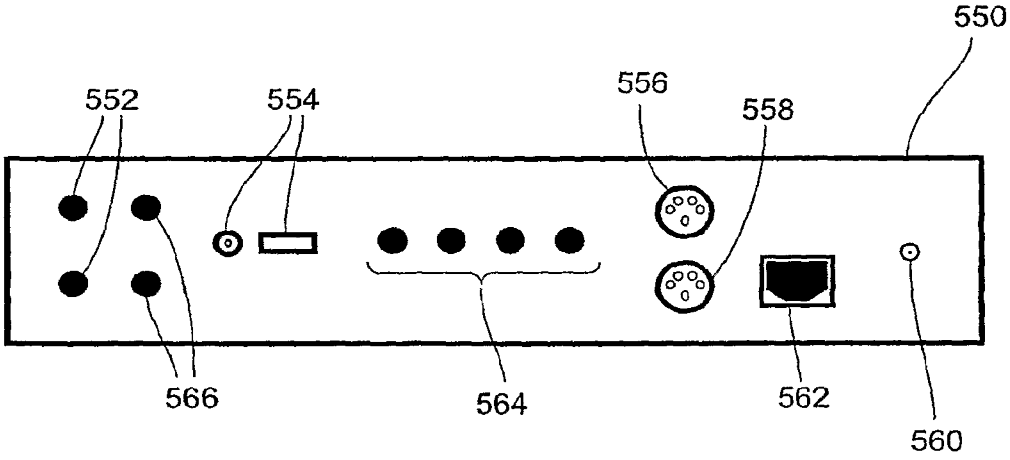
FIG. 7 is a view of the rear panel of the device in FIG. 6.

FIG. 7 is a view of the rear panel 550 of the rack unit in FIG. 6. It comprises analog audio inputs 566, analog audio outputs 552, digital audio inputs and outputs 554, external control interface inputs 564 to which can be connected expression pedals, drum triggers, and the like, MIDI inputs 556 and MIDI outputs 558, an Ethernet network port 562, and a power supply input 560.

Figure 8:
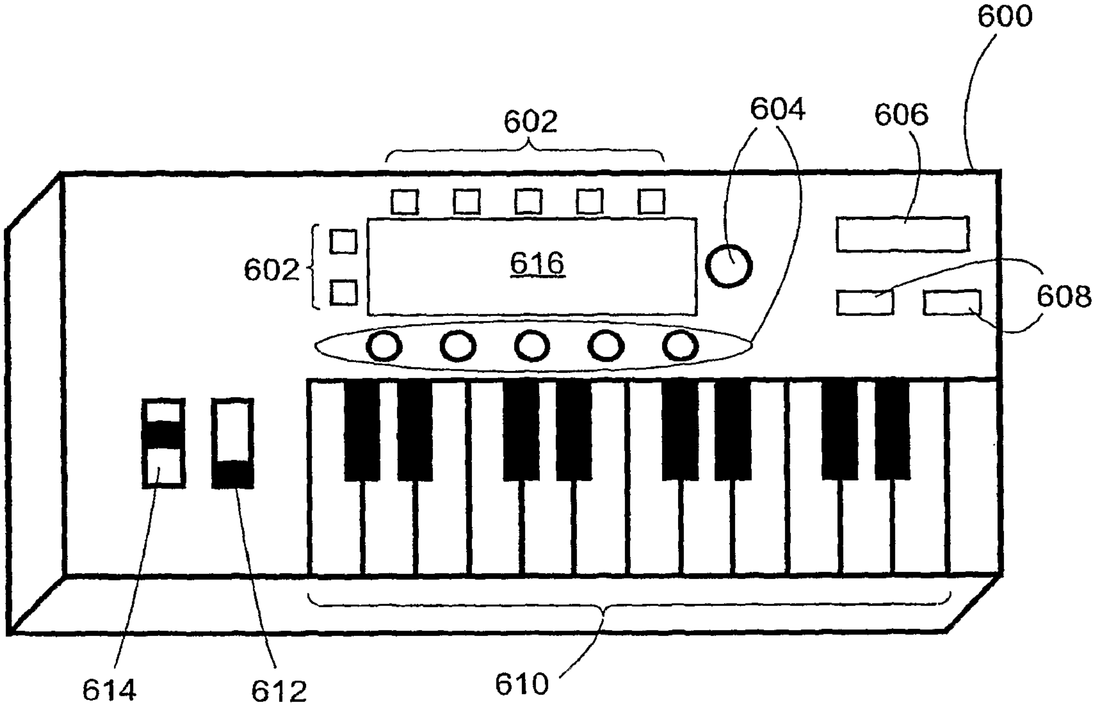
FIG. 8 is a ¾ view of a preferred embodiment, an audio synthesizer in a form factor popularly known as a "synthesizer keyboard".

FIG. 8 is a ¾ view of a preferred embodiment, an audio synthesizer in a form factor popularly known as a "synthesizer keyboard". The enclosure 600 comprises a piano-style keyboard 610 of varying size and number of keys (usually 2-6 octaves), a pitch bend wheel 614 and modulation wheel 612. Control knobs 604 and switches 602 surround a display 616, as in FIG. 6. Also as in FIG. 6 are an external storage slot 606 and USB ports 608.

Figure 9:
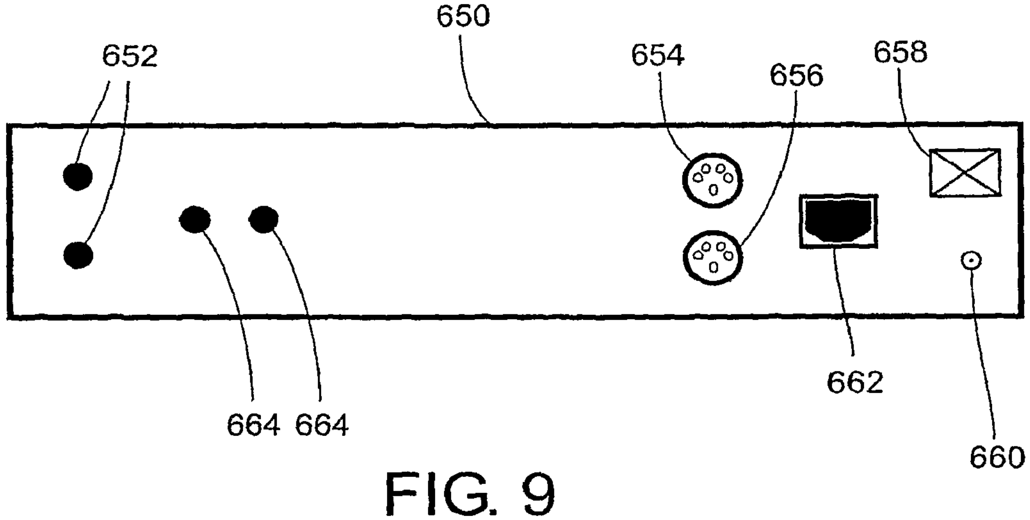
FIG. 9 is a view of the rear panel of the device in FIG. 8.

FIG. 9 is a view of the rear panel 650 of the synthesizer keyboard in FIG. 8. It comprises analog audio outputs 664 which generally carry the audio signals resulting when the user plays the keyboard; analog audio inputs 652 which allow processing and synthesis techniques such as vocoding; a MIDI input 654 which allows external control of the synthesizer, a MIDI output 656 which allows it to control other synthesizers or effects; an Ethernet network port 662; a power supply input 660; and a power switch 658.

Figure 10:
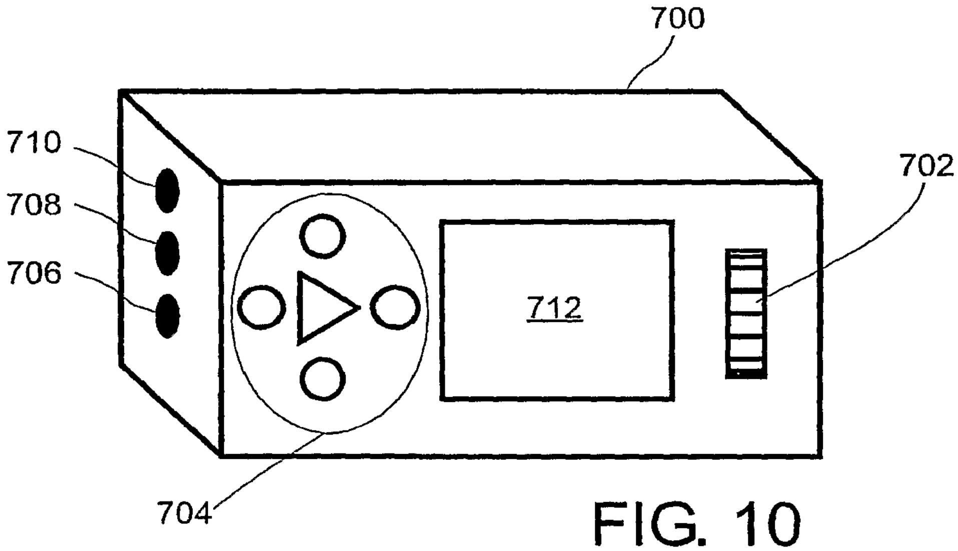
FIG. 10 is a ¾ view of a preferred embodiment, an audio player in a form factor popularly known as a "portable MP3 player".

FIG. 10 is a ¾ view of a preferred embodiment, an audio player in a form factor popularly known as a "portable MP3 player". The enclosure 700 comprises several control switches 704, a thumbwheel 702, and a display 712 showing information about the current song and playlist, menu options, or other useful information. The user listens to music via headphones connected to the headphone output 710. Line inputs 708, mic inputs 706, or an internal microphone (not shown) allow audio to be directly recorded to the player. Using the control switches and thumbwheel, the user can play songs, pause songs, fast forward and rewind songs, navigate between songs or playlists, adjust volume and equalization, and otherwise control and configure the device.

Figure 11:
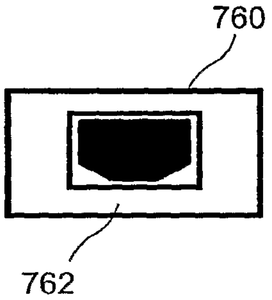
FIG. 11 is a view of the bottom panel of the device in FIG. 10.

FIG. 11 is a view of the right side panel 760 of the player in FIG. 10. A network connection, such as Ethernet or USB 762, allows the user to control and configure the device as previously described, including transferring audio files to and from the player, creating and editing playlists, adding equalization and effects on playback, and so on.

Our invention has been described in terms of its preferred embodiments, but is not limited to them. The description is not intended to be exhaustive, to limit the invention to the exact forms disclosed, or to enumerate every possible function of the forms described. The embodiments have been chosen to clearly illustrate the principles of the invention and their practical application, so that those skilled in the art can understand, modify, improve, and combine features of the invention or its embodiments, and apply them to other embodiments not specifically described herein.

For clarity and brevity, we use words as defined at the beginning of the Detailed Description in the claims that follow, unless otherwise indicated. For instance, words such as "software" and "audio input" have a specific definition as applied to this invention, and are used in that sense unless modified.

What is claimed is:

1. A method of controlling and/or configuring a device which processes and/or synthesizes audio, comprising:

- providing one or more digital processors in said device;
- providing one or more audio inputs on said device;
- providing one or more audio outputs on said device;
- providing a network connection on said device;
- providing software, running on one or more of said processors in said device, which processes and/or synthesizes audio;
- providing software that can control and/or configure said device, stored within said device, or on removable storage media contained within or connected to said device, and which can be run on a general purpose computer, said control and/or configuration software communicating with said audio processing and/or synthesis software running on said digital processors in said device;
- providing server software, running on one or more of said digital processors in said device, which interprets communications between said processing and/or synthesis software and said control and/or configuration software, and provides said control and/or configuration software to said computer;

said method comprising:

- connecting said device to a computer network;
- establishing a data connection between said device and said computer;
- requesting an interaction with said device;
- said server software running on said digital processors in said device transferring said control and/or configuration software to said computer;
- running said control and/or configuration software on said computer;
- a user interacting with said control and/or configuration software;
- said control and/or configuration software communicating with said audio processing and/or synthesis software running on said digital processors in said device, through said server software;
- said device controlling and/or configuring itself to process and/or synthesize audio via said audio processing and/or synthesis software as per said communication;

whereby running and using said control and/or configuration software allows said user to control and/or configure said device from said computer, without requiring said user to have previously found and installed said control and/or configuration software on said computer.

2. The method of claim 1 wherein said control and/or configuration software is a client of said server software.

3. The method of claim 1 wherein said control and/or configuration software is written in a machine-independent language.

4. The method of claim 1 wherein said computer network is a peer-to-peer network.

5. The method of claim 1 wherein said computer network is a non-peer-to-peer network.

6. The method of claim 1 wherein said method controls and configures an effects processor.

7. The method of claim 6 wherein said method controls and configures a stompbox, said method further comprising providing one or more user-operable controls on said device, said controls comprising buttons, switches, knobs, touchpads, touchscreens, and treadles, of which at least one of said controls is intended to be operable by the user's shod foot without damage to said device or said controls.

8. The method of claim 6 wherein said method controls and configures a rack effect, said method further comprising:

- providing means by which the enclosure of said device can be stably affixed to a mounting frame;
- providing one or more user-operable controls on said device said controls comprising buttons, switches, knobs, touchpads, and touchscreens.

9. The method of claim 1 wherein said method controls and configures a synthesizer, said method further comprising one or more of the following:

providing first controls on said device that trigger and/or modify audio output, collectively known as a keyboard and arranged to suggest a piano keyboard;

providing second controls on said device that trigger and/or modify audio output said second controls comprising drum pads, ribbon controllers, proximity and light sensors, buttons, knobs, pitch bend wheels, mod wheels, touchscreens, and switches;

providing third controls on said device that trigger audio output and/or represent steps in a stored sequence of notes, collectively known as a step sequencer;

providing means on said device by which said device may receive data representing said first, second, and/or third controls, said means comprising a MIDI port, USB port, expression pedal input, or other data input.

10. A device which processes and/or synthesizes audio, said device comprising:

one or more digital processors;

one or more audio inputs;

one or more audio outputs;

a network connection;

software, running on one or more of said processors in said device, which processes and/or synthesizes audio;

software that can control and/or configure said device, stored within said device, or on removable storage media contained within or connected to said device, and which can be run on a general purpose computer, said control and/or configuration software communicating with said audio processing and/or synthesis software running on said digital processors in said device;

server software, running on one or more of said digital processors in said device, which interprets communications between said processing and/or synthesis software and said control and/or configuration software, and provides said control and/or configuration software to said computer;

and which implements an improved method of control and/or configuration, said method comprising:

connecting said device to a computer network;

establishing a data connection between said device and said computer;

requesting an interaction with said device;

server software running on said digital processors in said device transferring said control and/or configuration software to said computer;

running said control and/or configuration software on said computer;

a user interacting with said control and/or configuration software;

said control and/or configuration software communicating with said audio processing and/or synthesis software running on said digital processors in said device, through said server software;

said device controlling and/or configuring itself to process and/or synthesize audio via said audio processing and/or synthesis software as per said communication;

whereby running and using said control and/or configuration software allows said user to control and/or configure said device from said computer, without requiring said user to have previously found and installed said control and/or configuration software on said computer.

11. The device of claim 10 wherein said control and/or configuration software is a client of said server software.

12. The device of claim 10 wherein said control and/or configuration software is written in a machine-independent language.

13. The device of claim 10 wherein said computer network is a peer-to-peer network.

14. The device of claim 10 wherein said computer network is a non-peer-to-peer network.

15. The device of claim 10 wherein said method controls and configures an effects processor.

16. The device of claim 15 wherein said device is a stompbox, said device further comprising one or more user-operable controls said controls comprising buttons, switches, knobs, touchpads, touchscreens, and treadles, of which at least one of said controls is intended to be operable by the user's shod foot without damage to said device or said controls.

17. The device of claim 15 wherein said device is a rack effect, said device further comprising:

means by which the enclosure of said device can be stably affixed to a mounting frame, such as a standard 19" equipment rack or Eurorack;

one or more user-operable controls such as buttons, switches, knobs, touchpads, and touchscreens.

18. The device of claim 10 wherein said device is a synthesizer, said device further comprising one or more of the following:

first controls that trigger and/or modify audio output, collectively known as a keyboard and arranged to suggest a piano keyboard;

second controls that trigger and/or modify audio output said second controls comprising drum pads, ribbon controllers, proximity and light sensors, buttons, knobs, pitch bend wheels, mod wheels, touchscreens, and switches;

third controls that trigger audio output and/or represent steps in a stored sequence of notes, collectively known as a step sequencer;

means on said device by which said device may receive a data stream representing said first, second, and/or third controls, said means comprising a MIDI port, USB port, expression pedal input, or other data input.

* * * * *